(12) United States Patent
Sasaki et al.

(10) Patent No.: US 11,407,885 B2
(45) Date of Patent: Aug. 9, 2022

(54) THERMOPLASTIC ELASTOMER COMPOSITION HAVING EXCELLENT MOLDING APPEARANCE AND A MOLDED PRODUCT OBTAINED THEREFROM

(71) Applicant: MITSUI CHEMICALS, INC., Tokyo (JP)

(72) Inventors: Masatoshi Sasaki, Tokyo (JP); Makoto Yaegashi, Chiba (JP); Kakeru Chigama, Ichihara (JP); Remi Kusumoto, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 184 days.

(21) Appl. No.: 16/491,100

(22) PCT Filed: Mar. 9, 2018

(86) PCT No.: PCT/JP2018/009239
§ 371 (c)(1),
(2) Date: Sep. 4, 2019

(87) PCT Pub. No.: WO2018/180371
PCT Pub. Date: Oct. 4, 2018

(65) Prior Publication Data
US 2020/0024435 A1    Jan. 23, 2020

(30) Foreign Application Priority Data
Mar. 29, 2017    (JP) .............................. JP2017-066222

(51) Int. Cl.
*C08L 23/12*    (2006.01)
*B60R 21/215*    (2011.01)
(Continued)

(52) U.S. Cl.
CPC ............ *C08L 23/12* (2013.01); *B60R 21/215* (2013.01); *C08J 3/24* (2013.01); *C08K 5/0016* (2013.01);
(Continued)

(58) Field of Classification Search
CPC ............................... C08L 23/12; B60R 21/215
See application file for complete search history.

(56) References Cited

U.S. PATENT DOCUMENTS

| 6,476,139 B2 | 11/2002 | Akaike et al. |
| 2011/0117358 A1 | 5/2011 | Kurita |
| 2017/0253709 A1 | 9/2017 | Kurita et al. |

FOREIGN PATENT DOCUMENTS

| CN | 102439087 A | 5/2012 |
| EP | 2 431 417 A1 | 3/2012 |

(Continued)

OTHER PUBLICATIONS

International Searching Authority, "International Search Report," issued in connection with International Patent Application No. PCT/JP2018/009239, dated May 29, 2018.

(Continued)

*Primary Examiner* — Arrie L Reuther
(74) *Attorney, Agent, or Firm* — Foley & Lardner LLP

(57) ABSTRACT

The present invention relates to a thermoplastic elastomer composition comprising 10 to 80 parts by mass of polyolefin resin (A), 10 to 80 parts by mass of styrene-based thermoplastic elastomer (B), and 1 to 20 parts by mass of at least partially crosslinked rubber (C) (with the total amount of the components (A), (B) and (C) being 100 parts by mass), wherein the composition has a type D hardness (i.e., the instantaneous value) of 35 or more and 70 or less in (Continued)

accordance with JIS K6253, and relates to a molded thermoplastic elastomer product obtained by molding the composition.

15 Claims, 1 Drawing Sheet

(51) Int. Cl.
  *C08J 3/24* (2006.01)
  *C08K 5/00* (2006.01)
  *C08K 5/14* (2006.01)
  *C08L 23/08* (2006.01)
  *C08L 53/02* (2006.01)
  *C08K 5/01* (2006.01)
(52) U.S. Cl.
  CPC .............. *C08K 5/14* (2013.01); *C08L 23/083* (2013.01); *C08L 23/0815* (2013.01); *C08L 53/02* (2013.01); *C08K 5/01* (2013.01); *C08L 2203/30* (2013.01); *C08L 2205/03* (2013.01)

(56) References Cited

FOREIGN PATENT DOCUMENTS

| JP | H0994926 A | 4/1997 |
|---|---|---|
| JP | H09-324100 A | 12/1997 |
| JP | H10-129387 A | 5/1998 |
| JP | 2000-119447 A | 4/2000 |
| JP | 2001-279030 A | 10/2001 |
| JP | 2007-254514 A | 10/2007 |
| JP | 2008-019345 A | 1/2008 |
| JP | 2010-024356 A | 2/2010 |
| WO | WO-2016/039310 A1 | 3/2016 |

OTHER PUBLICATIONS

International Searching Authority, "Written Opinion," issued in connection with International Patent Application No. PCT/JP2018/009239, dated May 29, 2018.

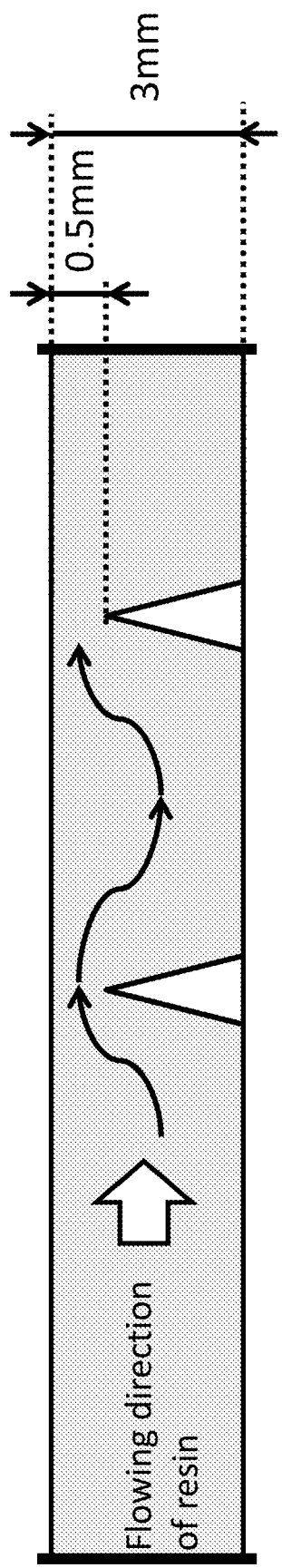

THERMOPLASTIC ELASTOMER COMPOSITION HAVING EXCELLENT MOLDING APPEARANCE AND A MOLDED PRODUCT OBTAINED THEREFROM

RELATED APPLICATIONS

The present application claims priority under 37 U.S.C. § 371 to International Patent Application No. PCT/JP2018/009239, filed Mar. 9, 2018, which claims priority to and the benefit of Japanese Patent Application No. 2017-066222, filed on Mar. 29, 2017. The contents of these applications are hereby incorporated by reference in their entireties.

TECHNICAL FIELD

The present invention relates to a thermoplastic elastomer composition and a molded product obtained therefrom.

BACKGROUND ART

Thermoplastic elastomers are light in weight and easily recyclable. Thus, thermoplastic elastomers are extensively used as energy-saving and resource-saving elastomers, and, in particular, as alternatives to vulcanized rubber or vinyl chloride resin, for automobile parts, industrial machinery parts, electric/electronic parts, and constructional materials.

In particular, an olefin-based thermoplastic elastomer comprises, as starting materials, an ethylene-propylene-non-conjugated diene copolymer (EPDM) and a crystalline polyolefin such as polypropylene. Thus, the specific gravity thereof is lower, and its durability in terms of heat aging resistance, weather resistance, and the like is superior to those of other types of thermoplastic elastomers. However, further improvement has been required depending on the application in question.

For example, vulcanized rubber is mainly composed of EPDM. Accordingly, it can be easily supplemented with a softening agent such as oil, and it is likely to soften. When the rubber content of an olefin-based thermoplastic elastomer is increased so as to soften the elastomer, in general, the flowability thereof deteriorates, and moldability becomes poor, disadvantageously.

While a thermoplastic elastomer composition comprising an olefin-based thermoplastic elastomer together with a styrene-based thermoplastic elastomer has been reported (e.g., Patent Literature 1 and Patent Literature 2), greater styrene-based thermoplastic elastomer content is likely to result in stickiness and lowered heat resistance. Thus, such composition has often been mainly composed of an olefin-based thermoplastic elastomer.

Patent Literature 3 describes a thermoplastic elastomer composition comprising 35 to 65 parts by mass of olefin-based thermoplastic elastomer (A) having a type A hardness (i.e., the instantaneous value) of 75 or less in accordance with JIS K6253 and 65 to 35 parts by mass of styrene-based thermoplastic elastomer (B) having a type A hardness (i.e., the instantaneous value) of 60 or less in accordance with JIS K6253 (with the total amount of the components (A) and (B) being 100 parts by mass), wherein the composition has a type A hardness (i.e., the instantaneous value) of 55 or less in accordance with JIS K6253.

When a molded product having thick-walled parts and thin-walled parts, for example airbag cover, is manufactured by injection molding using an olefin-based thermoplastic elastomer, it is known that the gloss becomes locally higher due to a rapid change of flowability, leading to deterioration of the appearance.

Until now though improvement of the appearance has been attempted by thickening thin-walled parts of a molded product, the appearance has been required to be improved without changing the thickness of thin-walled parts.

CITATION LIST

Patent Literature

Patent Literature 1: JP 2000-119447 A
Patent Literature 2: JP 2010-24356 A
Patent Literature 3: WO 2016/039310

SUMMARY OF INVENTION

Technical Problem

An object of the present invention is to provide a thermoplastic elastomer composition that can provide improved appearance without changing the thickness of thin-walled parts even when a molded product having thick-walled parts and thin-walled parts, for example airbag cover, is manufactured by injection molding.

Solution to Problem

Summary of the present invention is as follows.

(1) A thermoplastic elastomer composition comprising 10 to 80 parts by mass of polyolefin resin (A), 10 to 80 parts by mass of styrene-based thermoplastic elastomer (B), and 1 to 20 parts by mass of at least partially crosslinked rubber (C) (with the total amount of the components (A), (B) and (C) being 100 parts by mass), wherein the composition has a type D hardness (i.e., the instantaneous value) of 35 or more and 70 or less in accordance with JIS K6253.

(2) The thermoplastic elastomer composition according to the above (1), comprising 0 parts by mass or more and 10 parts by mass or less of plasticizer (D) relative to 100 parts by mass of the total amount of the components (A), (B) and (C).

(3) The thermoplastic elastomer composition according to the above (1) or (2), wherein the rubber (C) comprises an ethylene-α-olefin copolymer rubber and/or an ethylene-α-olefin-non-conjugated polyene copolymer rubber.

(4) A molded thermoplastic elastomer product obtained by molding the thermoplastic elastomer composition according to any one of the above (1) to (3).

(5) A molded thermoplastic elastomer product obtained by injection molding the thermoplastic elastomer composition according to any one of the above (1) to (3).

(6) The molded thermoplastic elastomer product according to the above (4) or (5), wherein a ratio (L1/L2) of a thickness of thickest part (L1) to a thinnest part (L2) of the molded product in a direction perpendicular to flowing direction of the resin during molding is 2 to 50.

(7) An automobile part comprising the molded thermoplastic elastomer product according to any one of the above (4) to (6).

(8) The automobile part according to the above (7) wherein the automobile part is an airbag cover.

Advantageous Effects of Invention

The thermoplastic elastomer composition of the present invention can provide improved appearance without changing the thickness of thin-walled parts even when a molded product having thick-walled parts and thin-walled parts, for example airbag cover, is manufactured by injection molding.

BRIEF DESCRIPTION OF DRAWINGS

The FIG is a reference drawing illustrating a state in which a molded product having thick-walled parts (3 mm) and thin-walled parts (0.5 mm) is manufactured.

DESCRIPTION OF EMBODIMENTS

The thermoplastic elastomer composition of the present invention will be specifically described in the following.

The thermoplastic elastomer composition of the present invention comprises a polyolefin resin (A), styrene-based thermoplastic elastomer (B), and at least partially crosslinked rubber (C).

[Polyolefin Resin (A)]

Examples of a polyolefin resin (A) used in the present invention preferably include an olefin-based plastic, and in particular a peroxide-degradable olefin-based plastic when using an organic peroxide as a crosslinking agent.

The term "peroxide-degradable olefin-based plastic" refers to an olefin-based plastic that is thermally degraded upon mixing thereof with peroxide during heating, thereby reducing its molecular weight, and it then achieves improved resin flowability. Examples thereof include isotactic polypropylene, or a copolymer of propylene with a small amount of another α-olefin, such as a propylene-ethylene copolymer, a propylene-1-butene copolymer, a propylene-1-hexene copolymer, and a propylene-4-methyl-1-pentene copolymer.

Examples of the peroxide-degradable olefin-based plastic include homopolymers or copolymers of α-olefins having 2 to 20 carbon atoms.

Specific examples of the above mentioned α-olefins include ethylene, propylene, 1-butene, 1-pentene, 3-methyl-1-butene, 1-hexene, 3-methyl-1-pentene, 4-methyl-1-pentene, and 1-octene.

Specific examples of the peroxide-degradable olefin-based plastic (b) include the (co)polymers described below:

(1) homopolymers of propylene;
(2) random copolymers of propylene with other α-olefin at a molar percentage of 10% or less;
(3) block copolymers of propylene with other α-olefin at a molar percentage of 30% or less;
(4) homopolymers of 1-butene;
(5) random copolymers of 1-butene with other α-olefin at a molar percentage of 10% or less;
(6) homopolymers of 4-methyl-1-pentene; and
(7) random copolymers of 4-methyl-1-pentene with other α-olefin at a molar percentage of 20% or less.

The polyolefin resin (A) used in the present invention usually has a melt flow rate within the range of 5 to 150 g/10 min as measured at 230° C. under a load of 2.16 kg (MFR: ISO1133, 230° C., load 2.16 kg), preferably within the range of 30 to 100 g/10 min.

When a phenol resin-based crosslinking agent is used as a crosslinking agent, again the olefin-based plastic similar to that mentioned as a peroxide-degradable olefin-based plastic can be used.

As the polyolefin resin (A) used in the present invention, copolymer of α-olefin with a small amount of other polymerizable monomer at a molar percentage of for example 10% or less, for example ethylene-vinyl acetate copolymer, ethylene-acrylic acid copolymer, ethylene-methacrylic acid copolymer, etc. can be used.

As the polyolefin resin (A) used in the present invention, polypropylene is particularly preferable.

Examples of a commercial product of polyolefin resin used in the present invention include, for example, Prime Polypro (Manufactured by Prime Polymer Co., Ltd.), MIRASON (Manufactured by Prime Polymer Co., Ltd.), Suntec (Manufactured by Asahi Kasei Chemicals Corporation), NOVATEC (Manufactured by Japan Polypropylene Corporation), Sumitomo NOBLEN (Manufactured by Sumitomo Chemical Company, Ltd), EVOLUE (Manufactured by Prime Polymer Co., Ltd.), HI-ZEX (Manufactured by Prime Polymer Co., Ltd.), and polymethylpentene resin (TPX) (Manufactured by Mitsui Chemicals, Inc.).

[Styrene-Based Thermoplastic Elastomer (B)]

Examples of styrene-based thermoplastic elastomer (B) used in the present invention preferably include ethylene-α-olefin-based copolymer mainly comprising ethylene and α-olefin containing 3 to 20 carbon atoms, wherein the ratio of styrene/ethylene-α-olefin (mass ratio) is usually within the range of 5/95 to 75/25, preferably 10/90 to 70/30.

The styrene-based thermoplastic elastomer (B) used in the present invention usually has a melt flow rate within the range of 0.1 to 50 g/10 min as measured at 230° C. under a load of 2.16 kg (MFR: ISO1133), preferably within the range of 1 to 40 g/10 min.

Specific examples of styrene-based thermoplastic elastomer (B) used in the present invention include styrene-isoprene block copolymers, hydrogenated products of styrene-isoprene block copolymers (SEP), hydrogenated products of styrene-isoprene-styrene block copolymers (SEPS; polystyrene-polyethylene/propylene-polystyrene block copolymers), styrene-butadiene copolymers, and hydrogenated products of styrene-butadiene block copolymers (SEBS; polystyrene-polyethylene/butylene-polystyrene block copolymers). More specific examples include Septon (manufactured by Kuraray Co., Ltd.), EARNESTON (manufactured by Kuraray Plastics Co., Ltd.), HYBRAR (manufactured by Kuraray Co., Ltd.), KRATON and KRATON G (manufactured by Kraton Polymer), Europrene SOLT (manufactured by Versalis), JSR-TR and JSR-SIS (manufactured by JSR), Quintac (manufactured by Zeon Corporation), and Tuftec (manufactured by Asahi Kasei Corporation) (tradenames).

It is preferably for the type A hardness (i.e., the instantaneous value) of the styrene-based thermoplastic elastomer (B) used in the present invention to be 96 or less in accordance with JIS K6253. The type A hardness (i.e., the instantaneous value) is further preferably 1 to 80.

[Crosslinked Rubber (C)]

Examples of the at least partially crosslinked rubber (C) used in the present invention preferably include, but not particularly limited to, a peroxide-crosslinkable olefin-based copolymer rubber and a phenol resin-crosslinkable olefin-based copolymer rubber.

An example of a peroxide-crosslinkable olefin-based copolymer rubber described above is an amorphous, random, elastic copolymer that is mainly composed of an olefin, such as ethylene-propylene copolymer rubber, ethylene-propylene-non-conjugated diene rubber, or ethylene-butadiene copolymer rubber. When such copolymer rubber is mixed with peroxide and kneaded during heating, the flowability thereof is reduced or eliminated due to crosslinking.

Specific examples of the peroxide-crosslinkable olefin-based copolymer rubbers include the following.
(1) Rubbers of an ethylene-α-olefin copolymer
[Ethylene:α-olefin (molar ratio)=about 95:5 to 50:50]
(2) Rubbers of an ethylene-α-olefin-non-conjugated polyene copolymer (preferably an ethylene-α-olefin-non-conjugated diene copolymer)
[Ethylene:α-olefin (molar ratio)=about 95:5 to 50:50]

Specific examples of the above mentioned α-olefin include ethylene, propylene, 1-butene, 1-pentene, 3-methyl-1-butene, 1-hexene, 3-methyl-1-pentene, 4-methyl-1-pentene, and 1-octene.

Specific examples of the non-conjugated dienes include: cyclic dienes, such as dicyclopentadiene, cyclooctadiene, methylenenorbornene (e.g. 5-methylene-2-norbornene), ethylidenenorbornene (e.g. 5-ethylidene-2-norbornene), methyltetrahydroindene, 5-vinyl-2-norbornene, 5-isopropylidene-2-norbornene, 6-chloromethyl-5-isopropenyl-2-norbornene, and norbonadiene; and chain dienes, such as 1,4-hexadiene, 3-methyl-1,4-hexadiene, 4-methyl-1,4-hexadiene, 5-methyl-1,4-hexadiene, 4,5-dimethyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, and 7-methyl-1,6-octadiene.

The Mooney viscosity $ML_{1+4}$ values (100° C.) of these copolymer rubbers are usually 10 to 300, and preferably 30 to 250. The iodine values are, if the above non-conjugated diene is copolymerized, preferably 25 or less.

Examples of rubbers used in the present invention include, in addition to the olefin-based copolymer rubber, diene type rubbers such as styrene-butadiene rubbers (SBR), nitrile rubbers (NBR), natural rubbers (NR), and butyl rubbers (IIR); SEBS, and polyisobutylene.

[Plasticizer (D)]

The thermoplastic elastomer composition of the present invention may comprise a plasticizer (softening agent) (D) if needed.

As a plasticizer (D), plasticizers usually used for rubbers can be used. Specifically, examples of a plasticizer include petroleum-based plasticizers such as process oil, lubricant oil, paraffin oil, liquid paraffin, petroleum asphalt, and vaseline; coal tar-based plasticizers such as coal tar and coal tar pitch; fatty oil-based plasticizers such as castor oil, linseed oil, rapeseed oil, soybean oil, and coconut oil; tall oil; rubber substitute (factice); waxes such as beeswax, carnauba wax, and lanolin; fatty acids and salts of fatty acids such as ricinoleic acid, palmitic acid, stearic acid, barium stearate, calcium stearate, and zinc laurate; naphtenic acid; pine oil, rosin or derivatives thereof; synthetic polymer substances such as terpene rein, petroleum rein, atactic polypropylene, and coumarone indene rein; ester-based plasticizers such as dioctyl phthalate, dioctyl adipate, and dioctyl sebacate; microcrystalline wax, liquid polybutadiene, modified liquid polybutadiene, liquid thiokol, and hydrocarbon-based synthetic lubricant oil. Among these, petroleum-based plasticizer, in particular process oil is preferably used.

The amount of plasticizers to be incorporated is preferably 0 parts by mass or more and 10 parts by mass or less in terms of suppression of bleeding and adhesion of coatings.

[Olefin-Based Thermoplastic Elastomer]

Above-mentioned polyolefin resin (A) and at least partially crosslinked rubber (C) may exist in a polyolefin-based perfectly or partially crosslinked thermoplastic elastomer.

Examples of partially crosslinked polyolefin-based thermoplastic elastomers within such perfectly or partially crosslinked polyolefin-based thermoplastic elastomers include:
(1) a partially crosslinked thermoplastic elastomer, which is obtained by subjecting a mixture comprising a peroxide-crosslinkable olefin-based copolymer rubber (a) and a peroxide-degradable olefin-based plastic (b) (polyolefin resin (A)) or a mixture comprising a peroxide-crosslinkable olefin-based copolymer rubber (a), a peroxide-degradable olefin-based plastic (b) (polyolefin resin (A)), and a peroxide-uncrosslinkable rubbery material (c) and/or a mineral-oil-based softening agent (d) to dynamic heat treatment in the presence of an organic peroxide; and
(2) a partially crosslinked thermoplastic elastomer (and a perfectly crosslinked thermoplastic elastomer), which is obtained by subjecting a mixture comprising a peroxide-crosslinkable olefin-based copolymer rubber (a), a peroxide-degradable olefin-based plastic (b) (polyolefin resin (A)), and a peroxide-uncrosslinkable rubbery material (c) and/or a mineral-oil-based softening agent (d) to dynamic heat treatment in the presence of an organic peroxide (or a phenol resin-based crosslinking agent) so as to obtain a crosslinked rubber composition and homogeneously incorporating a polyolefin resin (A) into the rubber composition.

The term "a peroxide-uncrosslinkable rubbery material (c)" refers to, for example, polyisobutylene, butyl rubber, atactic polypropylene, or propylene-α-olefin copolymer rubber comprising propylene at a molar percentage of 50% or more and being a hydrocarbon-based rubbery material that is not crosslinked upon mixing and kneading with peroxide during heating and thus it does not lose its flowability.

The term "a mineral-oil-based softening agent (d)" refers to a petroleum fraction having a high boiling point that is used to weaken the intermolecular actions of the rubber and facilitate processing at the time of general roll-processing of rubber, assist the dispersal of carbon black, white carbon, and the like, or improve the flexibility and elasticity of rubber by reducing the hardness of vulcanized rubber. Such agent is classified as a paraffin-based, naphthene-based, or aromatic-based agent. Examples of mineral-oil-based softening agents include paraffin-based process oils and naphthene-based process oils.

In the olefin-based thermoplastic elastomer that is preferably used in the present invention, the formulation ratio by mass of the olefin-based plastic (b) to the olefin-based copolymer rubber (a) (i.e., (b):(a)) is generally in the range from 90:10 to 10:90, and preferably in the range from 70:30 to 15:85.

When the olefin-based copolymer rubber is used in combination with another rubber, such other rubber is incorporated generally in an amount of 40 parts by mass or less, and preferably 5 to 20 parts by mass, relative to the total 100 parts by mass accounted for by the peroxide-degradable olefin-based plastic together with the rubber.

An olefin-based thermoplastic elastomer that is preferably used in the present invention comprises crystalline polypropylene and ethylene-α-olefin copolymer rubber or ethylene-α-olefin-non-conjugated diene copolymer rubber, such components exist in a partially crosslinked state in the olefin-based thermoplastic elastomer, and the formulation ratio by mass of the crystalline polypropylene to the rubber (crystalline polypropylene:rubber) is in the range from 70:30 to 10:90.

A more specific example of the olefin-based thermoplastic elastomer preferably used in the present invention is a thermoplastic elastomer obtained by subjecting the mixture comprising 30 to 90 parts by mass of rubber (a-1) comprising an ethylene-propylene copolymer rubber or ethylene-propylene-diene copolymer rubber, 70 to 10 parts by mass of crystalline polypropylene (b-1) (with the total amount of the components (a-1) and (b-1) being 100 parts by mass), and 5 to 150 parts by mass of rubber (c) other than the rubber (a-1) and/or the mineral-oil-based softening agent (d) to dynamic heat treatment in the presence of an organic peroxide, wherein the rubber (a-1) is partially crosslinked.

Specific examples of the aforementioned organic peroxides include dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl 4,4-bis(tert-butylperoxy) valerate, benzoyl peroxide, p-chlorobenzoyl peroxide, 2,4-dichlorobenzoyl peroxide, tert-butyl peroxybenzoate, tert-butylperoxy isopropyl carbonate, diacetyl peroxide, lauroyl peroxide, and tert-butyl cumyl peroxide.

From the viewpoint of odor and scorch stability, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, and n-butyl 4,4-bis(tert-butylperoxy) valerate are more preferable, and 2,5-dimethyl-2,5-di-(tert-butylperoxy)hexane, and 1,3-bis(tert-butylperoxyisopropyl) benzene are the most preferable.

The organic peroxide is used in a ratio of usually 0.01 to 5 parts by mass, and preferably 0.05 to 3 parts by mass, relative to the total 100 parts by mass accounted for by the crystalline polyolefin and the rubber together.

Upon crosslinking treatment by the above organic peroxide, crosslinking aids such as sulfur, p-quinone dioxime, p,p'-dibenzoylquinone dioxime, N-methyl-N,4-dinitrosoaniline, nitrosobenzene, diphenylguanidine, trimethylolpropane, N,N'-m-phenylenedimaleimide, divinylbenzene, triallyl cyanurate, and triallyl isocyanurate, polyfunctional methacrylate monomers, such as ethylene glycol dimethacrylate, diethylene glycol dimethacrylate, polyethylene glycol dimethacrylate, trimethylolpropane trimethacrylate, and allyl methacrylate, or polyfunctional vinyl monomers, such as vinyl butyrate and vinyl stearate, can be incorporated.

By using such compounds, a uniform and mild crosslinking reaction can be expected. In the present invention, in particular, divinylbenzene is the most preferable. Divinylbenzene is easy to handle, it is satisfactorily compatible with the crystalline polyolefin and the rubber that serve as the main components for the crosslinking treatment, and it has the ability to dissolve organic peroxides and to work as a dispersant thereof. Accordingly, the effects of crosslinking by heat treatment are uniform, and an olefin-based thermoplastic elastomer composition balanced in terms of flowability and physical properties can be obtained.

When the olefin-based thermoplastic elastomer used in the present invention is manufactured using a phenol resin-based crosslinking agent as a crosslinking agent, polyolefin resin (A) and uncrosslinked rubber (C), for example ethylene-α-olefin-non-conjugated polyene copolymer are preferably dynamically crosslinked by a phenol resin-based crosslinking agent. In the present invention, "dynamic crosslinking" means a process of crosslinking while applying shearing force to the above-mentioned mixture.

Examples of a phenol resin-based crosslinking agent include a halogenated phenol resin-based crosslinking agent. Examples of phenol resin-based crosslinking agents include resol resins that are manufactured by condensation of an alkyl-substituted phenol or unsubstituted phenol using an aldehyde in an alkali medium, preferably using formaldehyde, or also preferably by condensation of difunctional phenol dialcohols. An alkyl-substituted phenol is preferably an alkyl-substituted phenol having an alkyl substituent containing 1 to 10 carbon atoms. Furthermore, dimethylol phenols or phenol resins substituted at p-position with an alkyl group containing 1 to 10 carbon atoms are preferred. A phenol resin-based curing resin is typically a thermally crosslinkable resin, and is also referred to as a phenol resin-based crosslinking agent or a phenol resin.

Examples of the phenol resin-based curing resins (phenol resin-based crosslinking agents) can include a compound represented by the following general formula (I).

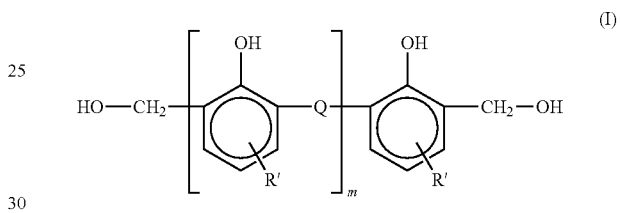

(wherein Q is a divalent group selected from the group consisting of —CH$_2$— and —CH$_2$—O—CH$_2$—, m is 0 or a positive integer of 1 to 20, and R' is an organic group.)

Preferably, Q is a divalent group —CH$_2$—O—CH$_2$—, m is 0 or a positive integer of 1 to 10, and R' is an organic group having less than 20 carbon atoms. More preferably, m is 0 or a positive integer of 1 to 5, and R' is an organic group having 4 to 12 carbon atoms. Specifically, examples thereof include alkyl phenol formaldehyde resins, methylolated alkyl phenol resins, halogenated alkyl phenol resins, and the like, preferably halogenated alkyl phenol resins, further preferably those with the end hydroxyl group brominated.

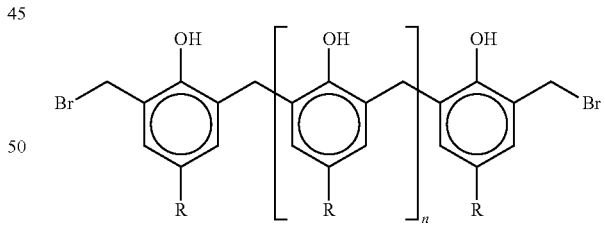

(wherein n is an integer of 0 to 10, and R is a C$_1$-C$_{15}$ saturated hydrocarbon group).

Examples of products of the phenol resin-based curing resins include TACKIROL™ 201 (alkyl phenol formaldehyde resin, made by Taoka Chemical Co., Ltd.), TACKIROL™ 250-I (brominated alkyl phenol formaldehyde resin that is 4% brominated, made by Taoka Chemical Co., Ltd.), TACKIROL™ 250-III (brominated alkyl phenol formaldehyde resin, made by Taoka Chemical Co., Ltd.), PR-4507 (made by Gunei Chemical Industry Co., Ltd.), Vulkaresat 510E (made by Hoechst), Vulkaresat 532E (made by Hoechst), Vulkaresen E (made by Hoechst), Vulkaresen 105E (made by Hoechst), Vulkaresen 130E (made by Hoechst), Vulkaresol 315E (made by Hoechst), Amberol ST 137X (made by Rohm & Haas), SUMILITERESIN™ PR-22193 (made by Sumitomo Durez Co., Ltd.), Symphorm-C-100 (made by Anchor Chem.), Symphorm-C-1001 (made by Anchor Chem.), TAMANOL™ 531 (made by Arakawa Chemical Industries, Ltd.), Schenectady SP1059 (made by Schenectady Chem.), Schenectady SP1045 (made by Schenectady Chem.), CRR-0803 (made by U.C.C), Schenectady SP1055F (made by Schenectady Chem., brominated alkyl phenolformaldehyde resin), Schenectady SP1056 (made by Schenectady Chem.), and CRM-0803 (made by Showa Union Synthesis Co., Ltd.), Vulkadur A (made by Bayer). Among these, halogenated phenol resin-based crosslinking agents are preferable, and brominated alkyl phenol.formaldehyde resins such as TACKIROL™ 250-I, TACKIROL™ 250-III, and Schenectady SP1055F are preferably used.

In addition, specific examples of crosslinking with thermoplastic vulcanized rubber phenol resins are described in U.S. Pat. Nos. 4,311,628 A, 2,972,600 A, and 3,287,440 A, and these technologies can also be used in the present invention.

U.S. Pat. No. 4,311,628 A discloses a phenol-based vulcanizing agent system (phenolic curative system) composed of a phenol-based curing resin (phenolic curing resin), and a vulcanizing activating agent (cure activator). A basic component of the system is a phenol resin-based crosslinking agent produced by condensation of a substituted phenol (for example, halogen substituted phenol or $C_1$-$C_2$ alkyl substituted phenol) or an unsubstituted phenol and an aldehyde, preferably formaldehyde, in an alkali medium, or by condensation of a bifunctional phenol dialcohol (preferably, dimethylol phenol substituted by a $C_5$-$C_{10}$ alkyl group at the para position). Halogenated alkyl substituted phenol resin-based crosslinking agents produced by halogenating an alkyl substituted phenol resin-based crosslinking agent is particularly suitable. A phenol resin-based crosslinking agent composed of a methylol phenol curing resin, a halogen donor, and a metal compound is particularly recommendable, the details of which are described in U.S. Pat. Nos. 3,287,440 A and 3,709,840 A. A non-halogenated phenol resin-based crosslinking agent is used together with a halogen donor, preferably a halogenated hydrogen scavenger. Usually, halogenated phenol resin-based crosslinking agents, preferably brominated phenol resin-based crosslinking agents containing 2 to 10% by mass of bromine, do not need a halogen donor, but are used together with a halogenated hydrogen scavenger such as a metal oxide such as, for example, iron oxide, titanium oxide, magnesium oxide, magnesium silicate, silicon dioxide, and zinc oxide, preferably zinc oxide. Usually 1 to 20 parts by mass of such a halogenated hydrogen scavenger as these including zinc oxide is used relative to 100 parts by mass of phenol resin-based crosslinking agent. The presence of such a scavenger facilitates the crosslinking action of a phenol resin-based crosslinking agent, but, for a rubber which is not easily vulcanized with a phenol resin-based crosslinking agent, a halogen donor and a zinc oxide are desirably used together therewith. A method for producing a halogenated phenol-based curing resin and uses thereof in a vulcanizing agent system using zinc oxide are described in U.S. Pat. Nos. 2,972,600 A and 3,093,613 A, the disclose of which, together with the disclose of U.S. Pat. Nos. 3,287,440 A and 3,709,840 A, is incorporated herein by reference. Examples of suitable halogen donors include tin chloride, ferric chloride, or halogen-donating polymers such as chlorinated paraffin, chlorinated polyethylene, chlorosulfonated polyethylene, and polychlorobutadiene (neoprene rubber). As used herein, the term "vulcanizing accelerator" refers to any substance that substantially increases the crosslinking efficiency of a phenol resin-based crosslinking agent and encompasses metal oxides and halogen donors, and these are used singly or in combination. For more detail of a phenol-based vulcanizing agent system, see "Vulcanization and Vulcanizing Agents" (W. Hoffman, Palmerton Publishing Company). Suitable phenol resin-based crosslinking agents and brominated phenol resin-based crosslinking agents are commercially available and, for example, crosslinking agents can be purchased from Schenectady Chemicals, Inc. under the trade name of "SP-1045", "CRJ-352", "SP-1055F", and "SP-1056". Similar phenol resin-based crosslinking agents that are equivalent in effect are available from other suppliers.

The phenol resin-based crosslinking agent generates a smaller amount of decomposition product and hence is a preferred vulcanizing agent in view of prevention of fogging. The phenol resin-based crosslinking agent is used in an amount sufficient to achieve the essentially complete vulcanization of rubber.

The phenol resin-based crosslinking agent is usually used in an amount of 0.1 to 20 parts by mass, preferably 1 to 10 parts by mass relative to 100 parts by mass of ethylene-α-olefin-non-conjugated polyene copolymer. When the amount of phenol resin-based crosslinking agent to be incorporated is within the above-mentioned range, a composition having excellent moldability can be obtained, and the obtained molded product has high strength and excellent oil resistance, as well as sufficient heat resistance and mechanical properties.

In dynamically crosslinking by the phenol resin-based crosslinking agent in the present invention, aids can be blended such as sulfur; peroxyl crosslinking aids such as p-quinonedioxime, p,p'-dibenzoylquinonedioxime, N-methyl-N,4-dinitrosoaniline, nitrosobenzene, diphenylguanidine, and trimethylolpropane-N,N'-m-phenylenedimaleimide; divinylbenzene, polyfunctional methacrylate monomers such as triallyl cyanurate, ethyleneglycol dimethacrylate, diethyleneglycol dimethacrylate, polyethyleneglycol dimethacrylate, trimethylolpropane trimethacrylate, and allyl methacrylate; polyfunctional vinyl monomers such as vinyl butyrate and vinyl stearate; and the like.

Uniform and gentle crosslinking reactions can be expected by using the aforementioned aids. As the aid, divinylbenzene is preferable. Divinylbenzene is easy to handle, has a favorable compatibility with a crystalline olefin-based polymer and an ethylene-α-olefin-non-conjugated polyene copolymer which are is included as a main component in a thermoplastic elastomer composition, has the effect of solubilizing the phenol resin-based crosslinking agent, and acts as a dispersion agent of the phenol resin-based crosslinking agent, so that the crosslinking effect by thermal treatment is homogeneous, allowing a thermoplastic elastomer composition having a balance between fluidity and physical properties to be obtained.

The aid is used in an amount of usually 2 parts by mass or less, preferably 0.3 to 1 parts by mass, relative to 100 parts by mass of the ethylene-α-olefin-non-conjugated polyene copolymer.

In addition, a dispersion accelerator may be used to accelerate the decomposition of the phenol resin-based crosslinking agent. Examples of decomposition accelerators include tertiary amines such as triethylamine, tributylamine, and 2,4,6-tri(dimethylamino)phenol; aluminum, cobalt, vanadium, copper, calcium, zirconium, manganese, magnesium, lead, mercury, and the like; naphthenates from naphthenic acid and various metals (for example, Pb, Co, Mn, Ca, Cu, Ni, Fe, Zn, rare earths); and the like.

The crosslinking aids or polyfunctional vinyl monomers are preferably used in a ratio of 0.01 to 5 parts by mass, and particularly preferably 0.05 to 3 parts by mass, relative to 100 parts by mass of the entire amount to be crosslinked. It is disadvantageous when the ratio of the crosslinking aids or polyfunctional vinyl monomers to be incorporated exceed 5 parts by mass for the following reasons. When the amount of the organic peroxide to be incorporated is excessive, the crosslinking reaction proceeds too rapidly, and the resulting thermoplastic elastomer suffers from poor flowability. When the amount of organic peroxide to be incorporated is too small, in contrast, the crosslinking aids or polyfunctional vinyl monomers remain in the thermoplastic elastomer as unreacted monomers, and the resulting thermoplastic elastomer may experience changes in physical properties caused by heat history at the time of the processing/molding. Thus, the crosslinking aids or polyfunctional vinyl monomers should not be incorporated in excessive amounts.

When subjected to "dynamic heat treatment" herein, the components described above are kneaded in a molten state. As the kneading apparatus, conventional kneading apparatuses, such as an open type mixing roll or a non-open type apparatus such as Banbury mixer, extruder, kneader, and continuous mixer, are used. Among these, non-open type kneading apparatuses are preferable, and kneading is preferably carried out in an inactive gas environment, such as a nitrogen or carbon dioxide gas environment.

Kneading is preferably carried out at a temperature at which the half-life of the organic peroxide to be used is less than one minute. Kneading is generally carried out at 150° C. to 280° C., and preferably from 170° C. to 270° C., generally for 0.5 to 20 minutes, and preferably for 1 to 10 minutes. The shear force to be applied, in terms of the shear velocity, is set so as to usually fall within the range of 10 to 50,000 $sec^{-1}$, and preferably of 100 to 10,000 $sec^{-1}$.

The perfectly crosslinked olefin-based thermoplastic elastomer can be prepared in accordance with the methods for preparing olefin-based thermoplastic elastomer (1) and (2) above while modifying the amount of the organic peroxide to be used, the kneading duration, and other conditions.

It is preferable for the type A hardness (i.e., the instantaneous value) of the olefin-based thermoplastic elastomer used in the present invention to be 60 or more in accordance with JIS K6253. The type A hardness (i.e., the instantaneous value) is generally 1 to 98, preferably 60 to 98, further preferably 70 to 98, and particularly preferably 80 to 98.

The olefin-based thermoplastic elastomer used in the present invention usually has a melt flow rate within the range of 0.1 to 100 g/10 min as measured at 230° C. under a load of 2.16 kg (MFR: ISO1133, 230° C., load 2.16 kg), preferably within the range of 1 to 100 g/10 min.

[Thermoplastic Elastomer Composition]

The thermoplastic elastomer composition of the present invention comprises 10 to 80 parts by mass of polyolefin resin (A), 10 to 80 parts by mass of styrene-based thermoplastic elastomer (B), and 1 to 20 parts by mass of at least partially crosslinked rubber (C) (with the total amount of the components (A), (B) and (C) being 100 parts by mass), preferably comprises 20 to 70 parts by mass of polyolefin resin (A), 20 to 70 parts by mass of styrene-based thermoplastic elastomer (B), and 1 to 15 parts by mass of at least partially crosslinked rubber (C) (with the total amount of the components (A), (B) and (C) being 100 parts by mass), more preferably comprises 30 to 60 parts by mass of polyolefin resin (A), 30 to 60 parts by mass of styrene-based thermoplastic elastomer (B), and 1 to 10 parts by mass of at least partially crosslinked rubber (C) (with the total amount of the components (A), (B) and (C) being 100 parts by mass). When the components (A), (B) and (C) are incorporated at the above proportion, the appearance of the molded product can be improved without changing the thickness of thin-walled parts even when a molded product having thick-walled parts and thin-walled parts, for example airbag cover, is manufactured by injection molding. For example, the appearance of the molded product can be improved without changing the thickness of thin-walled parts even when the molded product is manufactured by injection molding wherein ratio (L1/L2) of a thickness of thickest part (L1) to a thinnest part (L2) of the molded product in the direction perpendicular to flowing direction of the resin during molding is usually 2 or more and 50 or less (the lower limit is preferably 3 or more, more preferably 5 or more, and the upper limit is preferably 20 or less, more preferably 10 or less).

When the above proportion of the polyolefin resin (A) is less than 10 parts by mass, sufficient rigidness cannot be obtained and molding becomes difficult. On the other hand, when the proportion of polyolefin resin (A) is more than 80 parts by mass, surface gloss increases and lower effect of improvement in appearance is obtained. When the above proportion of the styrene-based thermoplastic elastomer (B) is less than 10 parts by mass, surface gloss significantly increases and the lower effect of improvement in appearance is expected. On the other hand, when the proportion of the styrene-based thermoplastic elastomer (B) is more than 80 parts by mass, sufficient rigidness cannot be obtained and molding becomes difficult. When the above proportion of the crosslinked rubber (C) is less than 1 part by mass or more than 20 parts by mass, the difference of appearance between thick-walled parts and thin-walled parts tends to be remarkable, and lower effect of improvement in appearance is obtained.

The thermoplastic elastomer composition of the present invention has a type D hardness (i.e., the instantaneous value) of 35 or more and 70 or less in accordance with JIS K6253. When the type D hardness (i.e., the instantaneous value) is less than 35, sufficient rigidness for molded products cannot be obtained and molding becomes difficult. On the other hand, the type D hardness is more than 70, surface gloss significantly increases and lower effect of improvement in appearance is expected.

The thermoplastic elastomer composition of the present invention has a type D hardness (i.e., the instantaneous value) of 35 to 70, preferably 40 to 70, more preferably 45 to 70.

The thermoplastic elastomer composition of the present invention preferably has a type A hardness (i.e., the instantaneous value) of 60 or more in accordance with JIS K6253, more preferably 70 to 98, still more preferably 85 to 98 in terms of moldability.

The thermoplastic elastomer composition of the present invention can be manufactured by employing the method of melt-kneading a polyolefin resin (A), styrene-based thermoplastic elastomer (B), and at least partially crosslinked rubber (C), and if needed, softening agent for rubber (for example the above mentioned mineral-oil-based softening agent(d)), ethylene-α-olefin copolymer, and additionally other components, followed by granulating or grinding.

In terms of flowability adjustment, the thermoplastic elastomer composition of the present invention is preferably manufactured by dynamically heat-treating a mixture comprising a part of polyolefin resin (A), an uncrosslinked rubber (C), an organic peroxide, and if needed other components to produce an olefin-based thermoplastic elastomer comprising partially or perfectly crosslinked rubber (C), then melt-kneading the obtained mixture with the rest of polyolefin resin (A), styrene-based thermoplastic elastomer (B), and if needed other components, followed by granulating or grinding.

As a kneading apparatus, a mixing roll and intensive mixer (for example, Banbury mixer, kneader), single- or twin-screw extruder etc. can be used, but a non-open type apparatus is preferable.

Since the thermoplastic elastomer composition of the present invention has high flowability, it is preferable to produce a molded product by injection molding method. Specifically, thermoplastic elastomer composition is injected into a cavity of a mold for injection molding in a closed state, and after injection is completed, a movable mold is moved while keeping the resin in contact with walls of the mold by expansion of the resin due to foaming gas, and the movable mold is stopped at the predetermined position of reference thickness to conduct molding. Foam injection molding by core back is possible in which the movable mold is pulled out to remove the product after cooling of the mold is completed. The temperature of the resin during injection is preferably within the range of 160 to 260° C.

The molded product of the present invention may be laminated onto an olefin-based resin substrate according to the embodiments 1 to 3.

Embodiment 1

Molding Method: Calender Molding or Extrusion Molding from T-Die
Laminating method: Successive method is conducted in which a sheet composed of a polyolefin-based substrate layer is foam molded and then a surface layer is laminated onto the substrate layer, or in the case of T-die extrusion molding, multilayer coextrusion molding is conducted.

Embodiment 2

Molding method: Multilayer extrusion molding
Laminating method: Multilayer coextrusion molding of a polyolefin-based substrate layer and a surface layer is conducted.

Embodiment 3

Molding method: Successive or simultaneous injection molding
Laminating method: Successive injection molding is conducted in which a polyolefin-based substrate layer is injection foamed and then a thermoplastic elastomer composition for a surface layer is injected to be laminated onto the substrate layer within a mold, or simultaneous method is conducted in which a substrate layer and a surface layer are injected simultaneously by so-called sandwich molding to mold a laminated part.

[Application of Thermoplastic Elastomer Composition]

The thermoplastic elastomer composition according to the present invention can be subjected to various known molding techniques, so that a molded thermoplastic elastomer product can be obtained. Specific examples of such techniques include extrusion molding, press molding, injection molding, calender molding, and hollow molding. In addition, the molded products such as sheets obtained via the molding techniques described above can be subjected to secondary processing, such as thermoforming.

While the applications of the molded products of a thermoplastic elastomer according to the present invention are not particularly limited, such products can be preferably used for various known applications, such as automobile parts, civil engineering and building components, electrical and electronic components, sanitary goods, and films and sheets.

The thermoplastic elastomer composition of the present invention can provide improved appearance without changing the thickness of thin-walled parts even when a molded product having thick-walled parts and thin-walled parts is manufactured by injection molding, and thus it is optimum for manufacturing a molded product having thick-walled parts and thin-walled parts, for example airbag cover, by injection molding.

[Automobile Parts]

The molded thermoplastic elastomer product according to the present invention is applicable to automobile parts, such as interior parts and exterior parts for automobiles. Examples thereof include weather strip materials, bumper moldings, side moldings, air spoilers, air duct hoses, wire harness grommets, rack and pinion boots, suspension cover boots, glass guide, inner belt line seals, corner moldings, glass encapsulation, hood seals, glass run channels, secondary seals, various types of packing material, hoses, and airbag cover. In particular, the thermoplastic elastomer composition according to the present invention is excellent in terms of injection moldability and injection foamability. Thus, molded products obtained via injection molding or foam injection molding are particularly preferable.

[Civil Engineering and Building Components]

The molded thermoplastic elastomer product according to the present invention is applicable to civil engineering and building components. Examples thereof include civil engineering and building materials such as soil improvements sheets, water stop plates, noise control materials, various gaskets and sheets, water stop materials, joint materials, and window frames for buildings. In particular, the thermoplastic elastomer composition according to the present invention is excellent in terms of injection moldability and injection foamability. Thus, molded products obtained via injection molding or foam injection molding are particularly preferable.

[Electrical and Electronic Components]

The molded thermoplastic elastomer product according to the present invention is applicable to electrical and electronic components such as wire coating materials, connectors, caps, and plugs. In particular, the thermoplastic elastomer composition according to the present invention is excellent in terms of injection moldability and injection foamability. Thus, molded products obtained via injection molding or foam injection molding are particularly preferable.

[Sanitary Goods]

The molded thermoplastic elastomer product according to the present invention is applicable to sanitary goods such as hygiene products, disposable diapers, and toothbrush handles. In particular, the thermoplastic elastomer composition according to the present invention is excellent in terms of injection moldability and injection foamability. Thus, molded products obtained via injection molding or foam injection molding are particularly preferable.

[Films and Sheets]

The molded thermoplastic elastomer product according to the present invention is applicable to films and sheets, such as infusion bags, medical containers, interior and exterior parts of automobiles, beverage bottles, clothing containers, food wrapping materials, food containers, retort containers, pipes, transparent substrates, and sealants. In particular, the thermoplastic elastomer composition according to the present invention is excellent in terms of injection moldability and injection foamability. Thus, molded products obtained via injection molding or foam injection molding are particularly preferable.

[Other]

Examples of other applications of the molded thermoplastic elastomer product according to the present invention include footwear such as shoe soles and sandals, leisure products such as swimming fins, swimming goggles, golf club grips, and baseball bat grips, gaskets, waterproof fabrics, belts, garden hoses, anti-slip tapes for stairs, and anti-slip tapes for distribution pallets.

The applications of the molded thermoplastic elastomer product according to the present invention are not limited to those described above, and such molded product has a wide variety of applications.

This description includes part or all of the content as disclosed in the description and/or drawing of Japanese Patent Application No. 2017-066222, which is a priority document of the present application.

EXAMPLES

Hereafter, the present invention is described in greater detail with reference to the examples, although the scope of the present invention is not limited to these examples.

The methods of measuring and evaluating physical properties performed below are as follows.

(1) Tensile Strength Test

Test strips (JIS dumbbell No. 3, thickness 2 mm) were made by injection molding in accordance with JIS 6251. The tensile strength (TB) (unit: MPa) and the elongation at break (EB) (unit: %) were measured at a tensile speed of 500 mm/min in an atmosphere of 23° C. or −35° C.

(2) Melt Flow Rate (MFR)

The melt low rate was measured at 230° C. under a load of 2.16 kg in accordance with ISO 1133 (or ASTM D1238).

(3) Shore Hardness Measurement (a) Shore D Hardness

The Shore D hardness was measured by a Shore D hardness tester in accordance with ISO 7619 (JIS K6253) using a laminated sheet having 6 mm thickness (stacked two strips each having 3 mm thickness) prepared with injection molded square plates of 3 mm thickness. The instantaneous value was obtained for Shore D hardness.

(b) Shore A Hardness

The Shore A hardness was measured by a Shore A hardness tester in accordance with JIS K6253 using a laminated sheet having 6 mm thickness (stacked three strips each having 2 mm thickness) prepared with injection molded square plates of 2 mm thickness. The instantaneous value was obtained for Shore A hardness.

(4) Appearance

Molded products having thick-walled parts (3 mm) and thin-walled parts (0.5 mm) shown in the FIG were made by injection molding. After molding, variation of gloss in a tear line part (the line at which a cover tears upon actuation of an airbag) generated at parts having difference of the thickness was observed visually, and evaluated using the following criteria. 1. Significant variation; 2. Slight variation; and 3. No visible variation Examples 1-2 and Comparative Example 1

<Materials Used>

The following materials were used as polyolefin resins (A).
Block polypropylene (PP-1)
Melt flow rate 10 g/10 min (230° C., load 2.16 kg)
Content of ethylene unit 14 mol %
Block polypropylene (PP-2)
Melt flow rate (ISO1133, 230° C., load 2.16 kg) 50 g/10 min
Density (ISO1183) 0.90 g/cm$^3$
Tensile modulus of elasticity (ISO527) 1450 MPa
Charpy impact strength (ISO179, 23° C.) 10 kJ/m$^2$
Deflection temperature under load (ISO75, 1.8 MPa) 55° C.

The following material was used as a styrene-based thermoplastic elastomer (B).
Styrene/ethylene-butylene copolymer (B-1)
Melt flow rate (ISO1133, 230° C., load 2.16 kg) 20 g/10 min
A hardness (ISO7619) 70
Density (ISO1183) 0.89 g/cm$^3$
Styrene/ethylene-butylene ratio (mass ratio)=20/80

The following material was used as a rubber (C).
Oil extended ethylene-propylene-5-ethylidene-2-norbornene copolymer rubber (C-1)
Content of ethylene unit 78 mol %
Iodine value 13
Limiting viscosity [η] 3.4 dl/g
Amount of extender oil: 40 parts by mass of plasticizer (Diana Process Oil PW-380, manufactured by Idemitsu Kosan Co., Ltd.) was incorporated relative to 100 parts by mass of rubber.

Example 1

50 parts by mass of oil extended ethylene-propylene-5-ethylidene-2-norbornene copolymer rubber (C-1), 50 parts by mass of block polypropylene (PP-1), 0.3 parts by mass of organic peroxide (PERHEXA 25B, manufactured by NOF Corporation) as a crosslinking agent, 0.3 parts by mass of divinylbenzene as a crosslinking aid, and 0.1 parts by mass of phenol-based antioxidant (Irganox 1010, manufactured by BASF Japan Ltd.) as an antioxidant were mixed sufficiently by a Henschel mixer, and the mixture was kneading-extruded under the following conditions.
Extruder (Product No. KTX-46, manufactured by Kobe Steel, Ltd., cylinder temperature: C1-C2 120° C., C3-C4 140° C., C5-C14 200° C., die temperature: 200° C., number of screw rotation: 400 rpm, extrusion rate: 80 kg/h)

To 100 parts by mass of partially or perfectly crosslinked thermoplastic elastomer composition (α) (melt flow rate (230° C., load 2.16 kg) 25 g/10 min, durometer hardness D39) obtained in the above process, 600 parts by mass of block polypropylene (PP-2), 550 parts by mass of styrene/ethylene-butylene copolymer (B-1), and 0.1 parts by mass of phenol-based antioxidant (Irganox 1010, manufactured by BASF Japan Ltd.) were added and mixed sufficiently by a Henschel mixer, and then the mixture was kneaded using an extruder under the following conditions.

Thus, the composition having a mass ratio of polyolefin resin (A)/styrene-based thermoplastic elastomer (B)/rubber (C) of 52.6/44.5/2.9 was obtained, and the physical properties were evaluated.

(Kneading Condition)
Extruder: Product No. KTX-46, manufactured by Kobe Steel, Ltd.
Cylinder temperature: C1-C2 120° C., C3-C4 140° C., C5-C14 200° C.
Die temperature: 200° C.
Number of screw rotation: 400 rpm
Extrusion rate: 80 kg/h

Example 2

A thermoplastic elastomer composition was obtained in the same way as Example 1 except that the mass ratio of polyolefin resin (A) (block polypropylene (PP-1), block polypropylene (PP-2)), styrene/ethylene-butylene copolymer (B-1), and ethylene-propylene-5-ethylidene-2-norbornene copolymer rubber (C-1) was changed as shown in Table 1.

Comparative Example 1

A thermoplastic elastomer composition was obtained in the same way as Example 1 except that the rubber component (ethylene-propylene-5-ethylidene-2-norbornene copolymer rubber (C-1)) was not incorporated and the mass ratio of polyolefin resin (A) (block polypropylene (PP-1), block polypropylene (PP-2)) and styrene/ethylene-butylene copolymer (B-1) was changed as shown in Table 1. The results of physical property evaluation of Examples 1-2 and Comparative Example 1 were shown in Table 2.

TABLE 1

| Raw material | Example 1 | Example 2 | Comparative Example 1 |
|---|---|---|---|
| Polyolefin resin (A) (PP-1 + PP-2) | 52.6 (PP-1:PP-2 = 50:600) | 52.6 (PP-1:PP-2 = 50:293) | 53 (PP-1:PP-2 = 0:100) |
| Styrene/ethylene-butylene copolymer (B-1) | 44.5 | 41.9 | 47 |
| Crosslinked rubber (C-1) | 2.9 | 5.5 | 0 |

TABLE 2

| Evaluation item | | Unit | Comparative Example 1 | Example 1 | Example 2 |
|---|---|---|---|---|---|
| Tensile test | TB | MPa | 14 | 13 | 12 |
| | EB | % | 550 | 550 | 530 |
| Low-temperature tensile test | TB | MPa | 28 | 28 | 31 |
| | EB | % | 240 | 400 | 400 |
| Flowability | MFR | g/10 min | 30 | 32 | 32 |
| Hardness | Shore D | — | 53 | 52 | 52 |
| | Shore A | — | 93 | 93 | 93 |
| Appearance | | — | 2 | 3 | 3 |

3-point evaluation
(3: No variation in gloss can be detected, 2: Slight variation in gloss can be detected, 1: Significant variation in gloss can be detected)

According to the present invention, variation of gloss in a tear line part (the line at which a cover tears upon actuation of an airbag) generated at parts having difference of the thickness after molding became less remarkable. This is because the variation of flowing property of resin due to the change of shape of the molded product was reduced by blending a plurality of resin having different flowability, and in addition, diffused reflection was caused due to the change in morphology of surface of the molded product.

All publications, patents, and patent applications cited herein are incorporated herein by reference in their entirety.

The invention claimed is:

1. A thermoplastic elastomer composition comprising 30 to 60 parts by mass of block polypropylene (A), 30 to 60 parts by mass of styrene/ethylene-butylene copolymer (B) having styrene/ethylene-butylene ratio (mass ratio) of 20/80, and 1 to 10 parts by mass of at least partially crosslinked ethylene-propylene-5-ethylidene-2-norborene copolymer rubber (C) having content of ethylene unit of 78 mol % (with the total amount of the components (A), (B) and (C) being 100 parts by mass), and 1.16 to 2.2 parts by mass of plasticizer (D) relative to 100 parts by mass of the total amount of the components (A), (B) and (C), wherein the composition has a type D hardness (i.e., the instantaneous value) of 35 or more and 70 or less in accordance with JIS K6253.

2. A molded thermoplastic elastomer product obtained by molding the thermoplastic elastomer composition according to claim 1.

3. The molded thermoplastic elastomer product according to claim 2, wherein a ratio (L1/L2) of a thickness of thickest part (L1) to a thinnest part (L2) of the molded product in a direction perpendicular to flowing direction of a resin during molding is 2 or more and 50 or less.

4. An automobile part comprising the molded thermoplastic elastomer product according to claim 3.

5. The automobile part according to claim 4, wherein the automobile part is an airbag cover.

6. An automobile part comprising the molded thermoplastic elastomer product according to claim 2.

7. The automobile part according to claim 6, wherein the automobile part is an airbag cover.

8. A molded thermoplastic elastomer product obtained by injection molding the thermoplastic elastomer composition according to claim 1.

9. The molded thermoplastic elastomer product according to claim 8, wherein a ratio (L1/L2) of a thickness of thickest part (L1) to a thinnest part (L2) of the molded product in a direction perpendicular to flowing direction of a resin during molding is 2 or more and 50 or less.

10. An automobile part comprising the molded thermoplastic elastomer product according to claim 9.

11. The automobile part according to claim 10, wherein the automobile part is an airbag cover.

12. An automobile part comprising the molded thermoplastic elastomer product according to claim 8.

13. The automobile part according to claim 12, wherein the automobile part is an airbag cover.

14. The thermoplastic elastomer composition according to claim 1, wherein the composition has a type A hardness (i.e., the instantaneous value) of 60 or more in accordance with JIS K6253.

15. The thermoplastic elastomer composition according to claim 1, wherein the composition comprises 52.6 parts by mass of the block polypropylene (A), 41.9 to 44.5 parts by mass of the styrene/ethylene-butylene copolymer (B) having styrene/ethylene-butylene ratio (mass ratio) of 20/80, and 2.9 to 5.5 parts by mass of at least partially crosslinked ethylene-propylene-5-ethylidene-2-norborene copolymer rubber (C) having content of ethylene unit of 78 mol % (with the total amount of the components (A), (B) and (C) being 100 parts by mass).

* * * * *